United States Patent
Park

(10) Patent No.: US 8,016,532 B2
(45) Date of Patent: Sep. 13, 2011

(54) ANTI-LOOSE LOCK NUT

(75) Inventor: Young Su Park, Incheon (KR)

(73) Assignee: Powerrex Corporation Co., Ltd., Incheon (KR)

( * ) Notice: Subject to any disclaimer, the term of this patent is extended or adjusted under 35 U.S.C. 154(b) by 116 days.

(21) Appl. No.: 12/092,836

(22) PCT Filed: Aug. 6, 2007

(86) PCT No.: PCT/KR2007/003772
§ 371 (c)(1),
(2), (4) Date: May 7, 2008

(87) PCT Pub. No.: WO2008/069399
PCT Pub. Date: Jun. 12, 2008

(65) Prior Publication Data
US 2010/0272539 A1    Oct. 28, 2010

(30) Foreign Application Priority Data
Dec. 7, 2006   (KR) .................. 10-2006-0123922

(51) Int. Cl.
*F16B 37/12*    (2006.01)
(52) U.S. Cl. ........................................... 411/251
(58) Field of Classification Search .......... 411/250–252, 411/947
See application file for complete search history.

(56) References Cited

U.S. PATENT DOCUMENTS

| | | | | |
|---|---|---|---|---|
| 491,814 A * | 2/1893 | Richards | ......... | 411/223 |
| 900,589 A * | 10/1908 | Ratcliffe | ......... | 411/262 |
| 1,179,446 A * | 4/1916 | Mennie | ......... | 411/198 |
| 1,189,079 A * | 6/1916 | Faulkner | ......... | 411/251 |
| 1,630,958 A * | 5/1927 | Mauch | ......... | 411/252 |
| 1,909,387 A * | 5/1933 | Young | ......... | 411/262 |
| 1,929,169 A * | 10/1933 | Hall | ......... | 411/262 |
| 3,565,149 A * | 2/1971 | Wetzel | ......... | 411/252 |
| 5,449,259 A * | 9/1995 | Clohessey | ......... | 411/262 |
| 6,015,251 A * | 1/2000 | Chung | ......... | 411/252 |

* cited by examiner

*Primary Examiner* — Flemming Saether
(74) *Attorney, Agent, or Firm* — Edwards Angell Palmer & Dodge LLP; Kongsik Kim

(57) ABSTRACT

The invention is an anti-loose lock nut which prevents a screw coupling between a bolt 12 and a nut 10 by a coil spring 11 which is mounted in the inner circumferential surface of the nut 10 from loosening, the anti-loose lock nut characterized in that: an extended diameter portion 50 whose inner diameter is wider than the thread 13 of the nut 10 and in the inside of which a spiral groove is not formed, is formed in the inner circumferential surface of the nut 10; an insertion groove 52 into which a bent end portion 51 is fit-coupled is formed in the end of the extended diameter portion 50, in which the end of the coil spring 11 is outwardly bent to form the bent end portion 51; a semicircular curved portion 53 is protrudingly formed in the inner surface of the coil spring 11, and the outer surface of the coil spring 11 is formed of a flat cross-sectional plane; clearance spaces 54 and 55 which are respectively wider by one pitch than a thread pitch P of the bolt 12, are formed in the lengthy width of the extended diameter portion 50 and the insertion groove 52, after the coil spring 11 has been mounted.

2 Claims, 4 Drawing Sheets

ANTI-LOOSE LOCK NUT

TECHNICAL FIELD

The present invention relates to an anti-loose lock nut, and more particularly, to an anti-loose lock nut of a new structure including a nut which can prevent loosening of a bolt, to thereby prevent damage of the bolt when the nut is combined with the bolt, as well as reinforce a coupling force between the bolt and the nut.

BACKGROUND ART

In general, if a mechanical shock such as vibration occurs from the outside in the case of a bolt and a nut which are combined in the form of a screw, the nut or bolt is loosened due to clearance existing between threads of the bolt and nut, and thus a structure, device or facility combined by the bolt and nut becomes loose, to resultantly cause an accident to occur. In particular, to prevent bolts and nuts from being loosened in devices or facilities which are installed in places where vibrations are severely generated, such as vessel engines, piping facilities, steel plants, power generation facilities, railroads, and bridges, is to avoid an accident from occurring. Accordingly, various devices which prevent nuts and bolts from being loosened are being developed as well as are already developed.

One of them includes an anti-loose means such as a coil spring in the inside of the nut. Such a conventional anti-loose lock nut is illustrated in FIG. 1. As illustrated, a coil spring 11 is installed around the inner circumferential surface of a nut 10. A bent portion 30 which is protruded to the outside is formed at the end of the coil spring 11. The bent portion 30 is fit-coupled with an insertion groove 31 which is formed on the bottom of the nut 10. Thus, the coil spring 11 is fixed not to rotate around the inner circumferential surface of the nut 10. In addition, an extended diameter portion 32 whose inner diameter is wider than the thread 13 is formed in the inner circumferential surface of the nut 10. A spiral groove 33 which guides the coil spring 11 is formed in the extended diameter portion 32. Thus, the coil spring 11 is inserted into the spiral groove 33 to then be fixed. The coil spring 11 is fabricated by winding an elastic wire whose cross-section is a regularly circular form in a spiral direction. A wire whose diameter equals or smaller than the thread pitch of the bolt 12 is used as the elastic wire of FIG. 1.

As described above, the bolt 12 is fixed by the coil spring 11, and the threads 14 of the bolt 12 closely contact and are tightly tied with the gully portions of the coil spring 11. Accordingly, the bolt 12 is not loosened from the nut 10. Thus, if the nut 10 circumvolves by a stronger force than intensity of the coil spring 11, in order to unlock the bolt 12 and the nut 10, the bent portion 30 of the coil spring 11 is cut and untied.

However, since the spiral groove 33 is formed in the extended diameter portion 32, and thus the coil spring 11 is inserted into and fixed to the spiral groove 33, it is difficult to match the bolt 12 and the coil spring 11 in the case that the start point of the thread 14 of the bolt 12 does not equal to the start point of the windings of the coil spring 11. In particular, carbon steel of high carbon content or alloy steel including chrome is mainly used as the elastic wire. Since spring steel such as carbon steel of high carbon content or alloy steel including chrome has a higher intensity than general steel which is used as general bolts, the thread 14 of the bolt 12 can be worn out or damaged before the bolt 12 is rotated into and matches the coil spring 11. Accordingly, if the bolt 12 and the coil spring 11 are fitted with each other by force at the state where the bolt 12 and the coil spring 11 do not match, the screw coupling between the bolt 12 and the coil spring 14 becomes unstable. As a result, structures or facilities which are combined with the bolts and nuts may be defective to accordingly cause dangerous accidents to occur.

In addition, since the cross-sectional area of the coil spring 11 is fabricated to have a regularly circular type cross-section having the same or smaller diameter as that of the pitch of the bolt 12, the cross-sectional area of the coil spring 11 is limited. Accordingly, there is a limit to heighten elasticity and intensity of the coil spring 11. Further, since the coil spring 11 has no sufficient force for tightening the bolt 12, there is a shortcoming that the bolt 12 is loosened by a small amount of force. In addition, it is preferable that the intensity with which the bent portion 30 is cut is varied according to the use place in the case of the anti-loose lock nut, but since the cross-sectional area of the coil spring 11 is limited, it is difficult to control the intensity of the bent portion 30 in various amounts. As a result, there is a problem that the bent portion 30 is unfolded or cut, to thereby cause a function of holding the bolt 12 to be lost.

DISCLOSURE OF THE INVENTION

To solve the above conventional problems, it is an object of the present invention to provide an anti-loose lock nut of a new structure which can reinforce a coupling force between a bolt and a nut, as well as prevent loosening and damage of a bolt, in which a bolt smoothly matches a coil spring which is mounted in the nut.

TECHNICAL SOLUTION

To accomplish the above object of the present invention, according to an aspect of the present invention, there is provided an anti-loose lock nut which prevents a screw coupling between a bolt 12 and a nut 10 by a coil spring 11 which is mounted in the inner circumferential surface of the nut 10 from loosening, the anti-loose lock nut characterized in that:

an extended diameter portion 50 whose inner diameter is wider than the thread 13 of the nut 10 and in the inside of which a spiral groove is not formed, is formed in the inner circumferential surface of the nut 10;

an insertion groove 52 into which a bent end portion 51 is fit-coupled is formed in the end of the extended diameter portion 50, in which the end of the coil spring 11 is outwardly bent to form the bent end portion 51;

a semicircular curved portion 53 is protrudingly formed in the inner surface of the coil spring 11, and the outer surface of the coil spring 11 is formed of a flat cross-sectional plane;

clearance spaces 54 and 55 which are respectively wider by one pitch than a thread pitch P of the bolt 12, are formed in the lengthy width of the extended diameter portion 50 and the insertion groove 52, after the coil spring 11 has been mounted.

According to another aspect of the present invention, the coil spring 11 is obtained by winding an elastic wire in a spiral direction, in which according to the cross-sectional shape, the lengthy direction width H of the coil spring 11 is narrower than the thread pitch P of the bolt 12 and the central direction width L of the coil spring 11 is wider than the thread pitch P of the bolt 12.

According to still another aspect of the present invention, the winding pitch W of the coil spring 11 is the same or smaller than the thread pitch P of the bolt 12.

BRIEF DESCRIPTION OF THE DRAWINGS

The above and other objects and advantages of the present invention will become more apparent by describing the preferred embodiments thereof in detail with reference to the accompanying drawings in which.

BEST MODE FOR CARRYING OUT THE INVENTION

The foregoing and/or other aspects of the present invention will become more apparent through the following description.

Hereinbelow, an anti-loose lock nut according to an exemplary embodiment of the present invention will be described with reference to the accompanying drawings.

Figure 1:
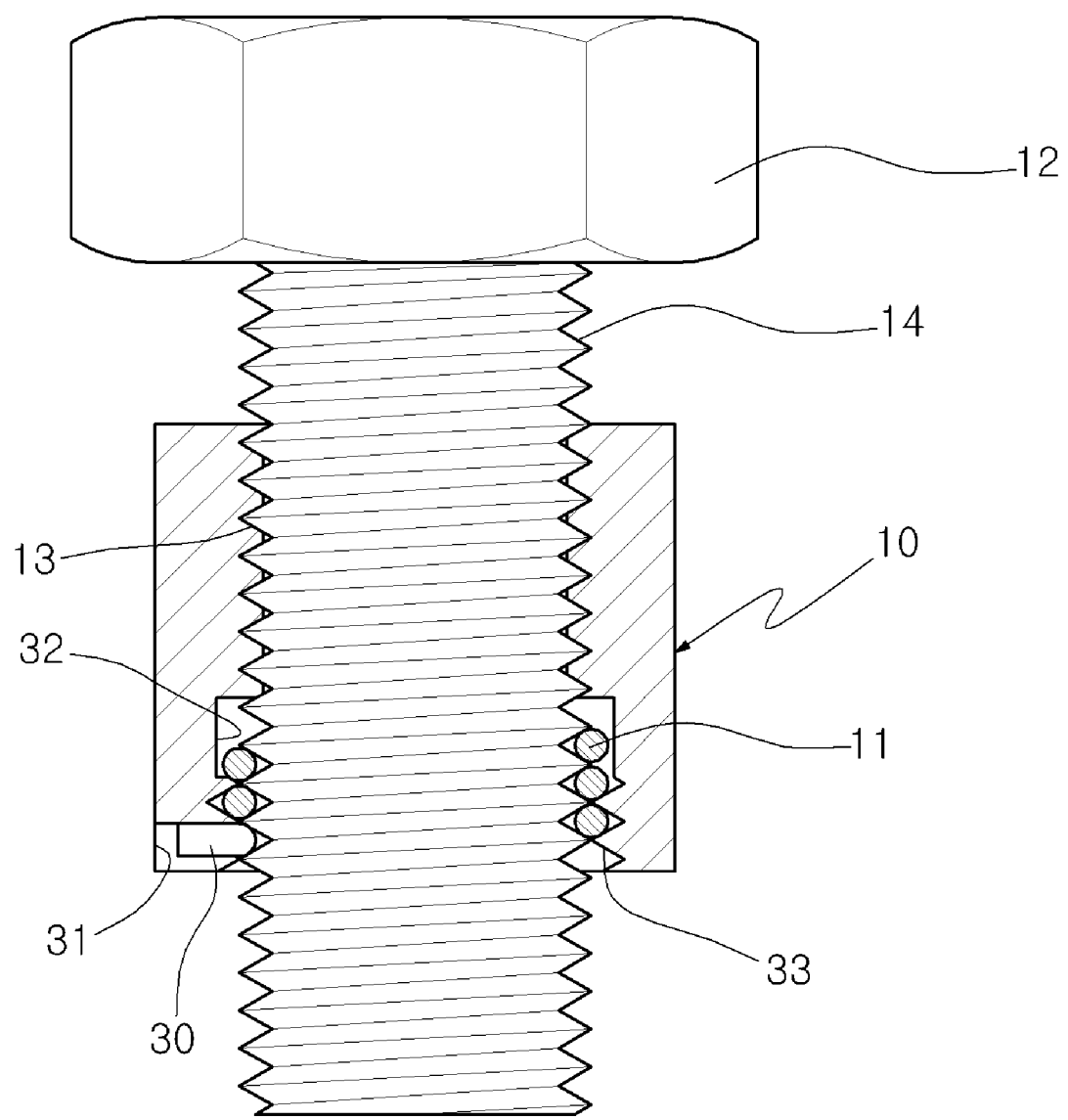
FIG. 1 is a cross-sectional view illustrating a conventional nut which is coupled with a bolt.
Figure 2:
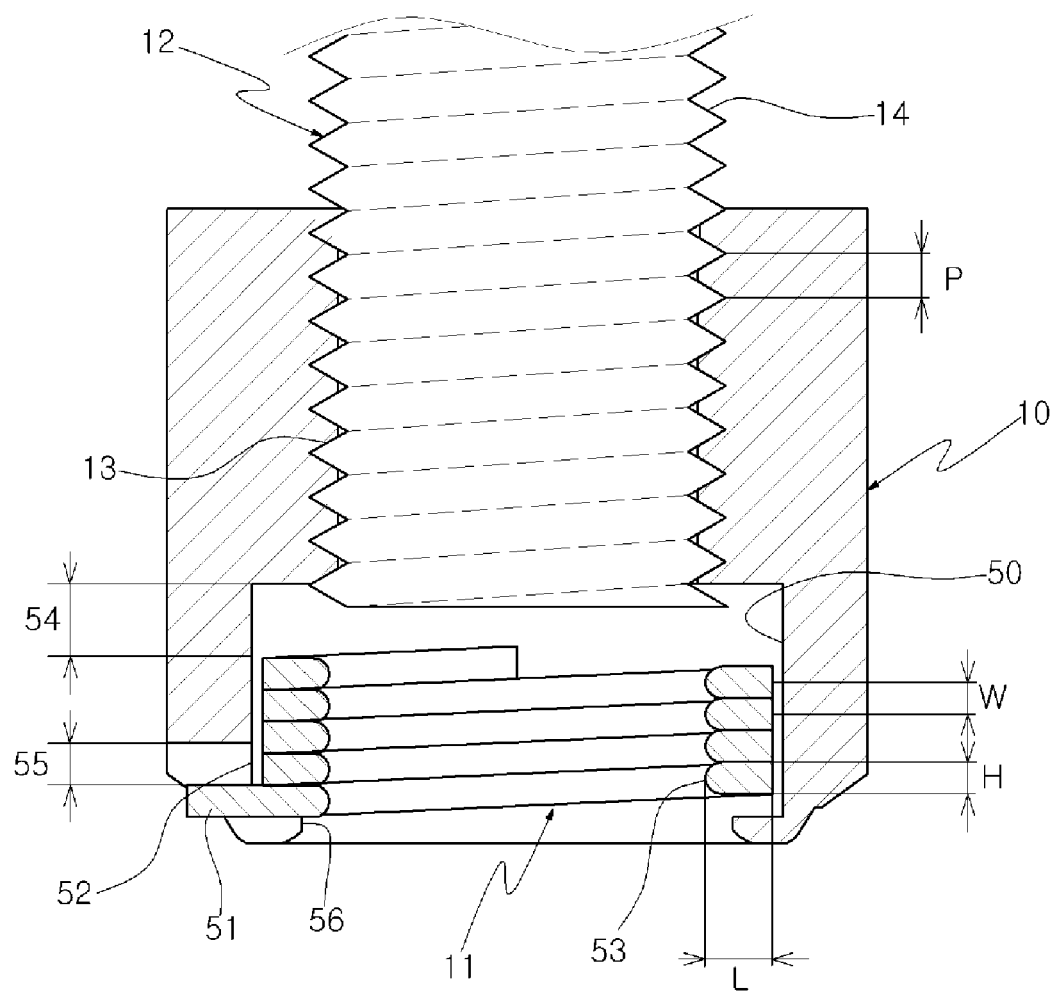
FIG. 2 is a cross-sectional view illustrating an anti-loose lock nut according to an exemplary embodiment of the present invention.
Figure 3:
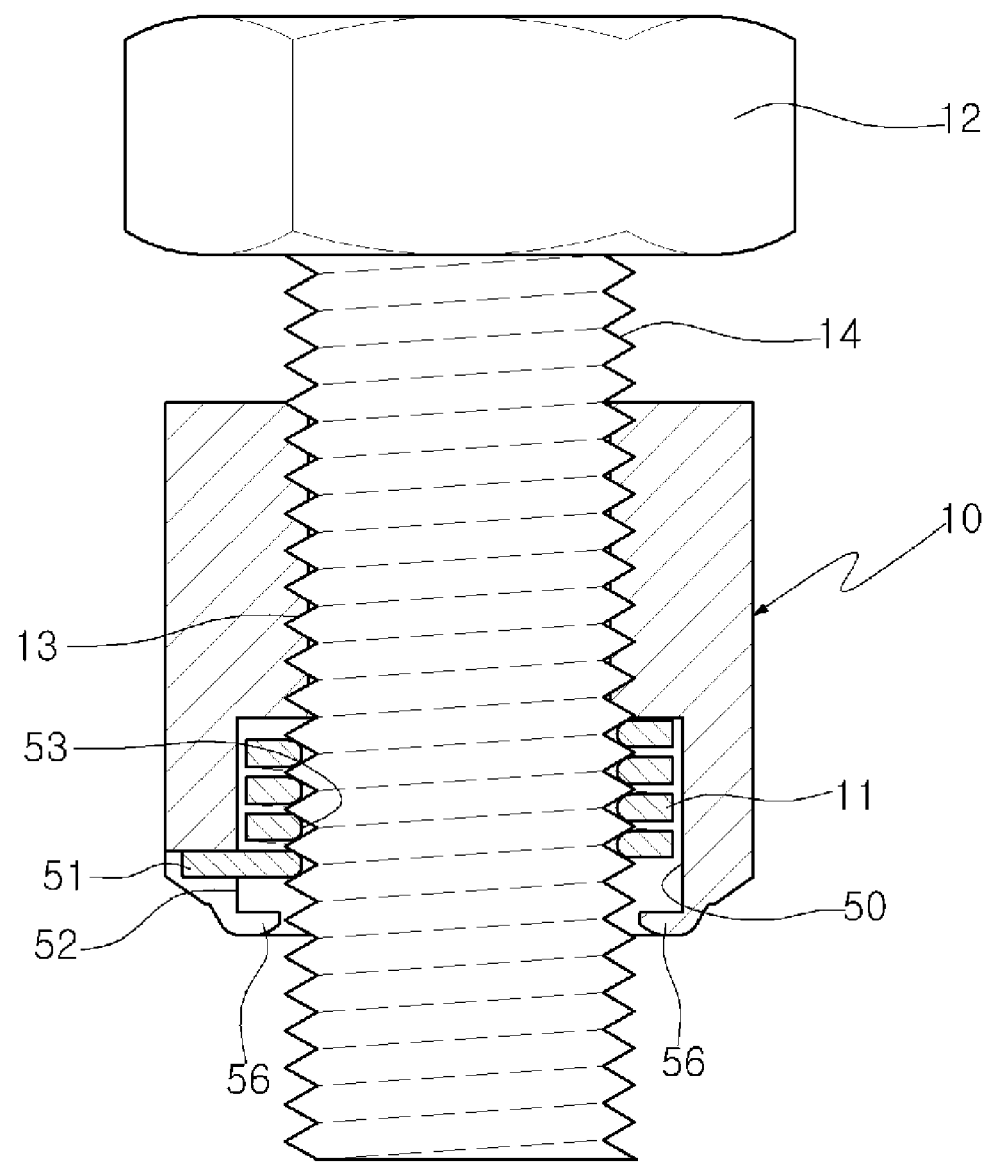
FIG. 3 is a cross-sectional view illustrating an anti-loose lock nut which is coupled with a bolt, according to an exemplary embodiment of the present invention.

FIGS. 2 through 5 illustrate an anti-loose lock nut according to an exemplary embodiment of the present invention. As illustrated in FIGS. 2 and 3, a coil spring 11 is mounted in the inner circumferential surface of a nut 10 to prevent a bolt 12 which is screw-combined with the nut 10 from being loosened. This is similar to that of a conventional anti-loose lock nut.

As shown in FIGS. 2 and 3, threads 13 are formed on the inner circumferential surface of the nut 10 at the entrance side of the nut 10, and an extended diameter portion 50 is formed over a predetermined length at the exit side through which the end of the bolt 12 is protruded. The coil spring 11 is inserted into the extended diameter portion 50. The extended diameter portion 50 is fabricated by a drill process of the exit side of the nut 10 to widen the inner diameter of the nut 10. A spiral groove for guiding the coil spring 11 is not formed in the extended diameter portion 50. An insertion groove 52 which is formed lengthily in the lengthy direction is formed in the end of the exit side of the nut 10. A bent end portion 51 of the coil spring 11 is movably fitted into and coupled with the insertion groove 52. In addition, a protruding support portion 56 is protruded inwards at the outer end of the exist side of the nut 10, to thus prevent the coil spring 11 from escaping from the extended diameter portion 50 by the protruding support portion 56. In more detail, threads 13 are formed at the entrance side of the nut 10 to fit with the standard, and the extended diameter portion 50 is formed by a drill process at the exit side of the nut 10. One surface of the extended diameter portion 50 is partially cut along the lengthy direction to form the insertion groove 52. The protruding support portion 56 is formed by pressurizing the nut 10 by press so that the end of the exit side of the nut 10 is protruded inwards at the state where the coil spring 11 has been fitted into and coupled with the insertion groove 52.

As illustrated in FIG. 2, clearance spaces 54 and 55 are formed in the length direction, in the extended diameter portion 50 and the insertion groove 52, respectively, at the state where when the coil spring 11 and the bent end portion 51 of the coil spring 11 have been inserted into the extended diameter portion 50 and the insertion groove 52, respectively. The whole of the coil spring can be moved by the clearance spaces 54 and 55. Particularly, the clearance space 54 formed in the extended diameter portion 50 is to smoothly match a point in place where the thread 14 of the bolt 12 starts and a point in place where the winding of the coil spring 11 starts. Since the point in place where the winding of the coil spring 11 starts conforms with the point in place where the thread 14 of the bolt 12 starts within the range of 360 degrees that the bolt 12 rotates, irrespective of the point in place where the winding of the coil spring 11 starts, the point in place where the winding of the coil spring 11 starts automatically conforms with the point in place where the thread 14 of the bolt 12 starts during the time when the bolt 12 moves by at least pitch in the clearance spaces 54.

Also, when the coil spring 11 is wound, it is possible to wind the coil spring 11 in various winding pitches W. However, it is most preferable that the winding pitch W of the coil spring 11 is formed smaller than the thread pitch P of the bolt 12. This is to form the lengthy direction width H of the coil spring 11 into the smallest width at maximum. If the coil spring 11 is wound with the coil spring 11 closely contact each other, the winding pitch W of the coil spring 11 is formed smaller than the thread pitch P of the bolt 12. The coil spring 11 whose length is formed in small size is easily inserted into the extended diameter portion 50, and is convenient to pressurize the protruding support portion 56 by press as well. Also, the lengthy direction width of extended diameter portion 50 is determined by the whole length of the coil spring 11. Accordingly, if the length of the coil spring 11 is formed in small size, it is unnecessary to form the lengthy direction width of the extended diameter portion 50 is formed in lengthy size. As a result, loss of a material for the extended diameter portion can be prevented.

Also, if the bolt 12 and the coil spring 11 are conformed at the state where the winding pitch W of the coil spring 11 is smaller than the thread pitch P of the bolt 12, the winding pitch W of the coil spring 11 becomes large, and then is coupled with the thread of the bolt 12. Accordingly, the coil spring 11 is unfolded substantially similarly to the overall length of the extended diameter portion 50. Thus, both ends of the coil spring 11 are supported by the extended diameter portion 50, and are applied by the compressive force of the coil spring 11 itself, as well, to thereby clamp the bolt 12 more firmly.

Meanwhile, if the bolt 12 and the coil spring 11 are conformed at the state where the winding pitch W of the coil spring 11 is larger than the thread pitch P of the bolt 12, the winding pitch W of the coil spring 11 becomes small, and then is coupled with the thread of the bolt 12. Accordingly, the clearance space 54 of the extended diameter portion 50 becomes further wider, and is applied by the expansion force of the coil spring 11 itself as well, to thereby curtail a coupling force of clamping the bolt 12.

Also, the coil spring 11 is obtained by winding an elastic wire having a cross-sectional shape whose inner surface is curved and outer surface is flat in a spiral direction. Carbon steel of high carbon content or alloy steel including chrome is mainly used as the elastic wire. In more detail, according to the cross-sectional shape, the central direction width L of the coil spring 11 is wider than the thread pitch P of the bolt 12, and the lengthy direction width H of the coil spring 11 is narrower than the thread pitch P of the bolt 12. This is to form a semicircular curved portion 53 in the inner surface of the coil spring 11 to contact the thread 14 of the bolt 12 on a point-to-point basis or line-to-line basis. Even if foreign matter is intervened on the thread 14 of the bolt 12, the bolt 12 and the nut 10 can smoothly match by the semicircular curved portion 53 without damage to the thread 14 of the bolt 12.

Figure 4:
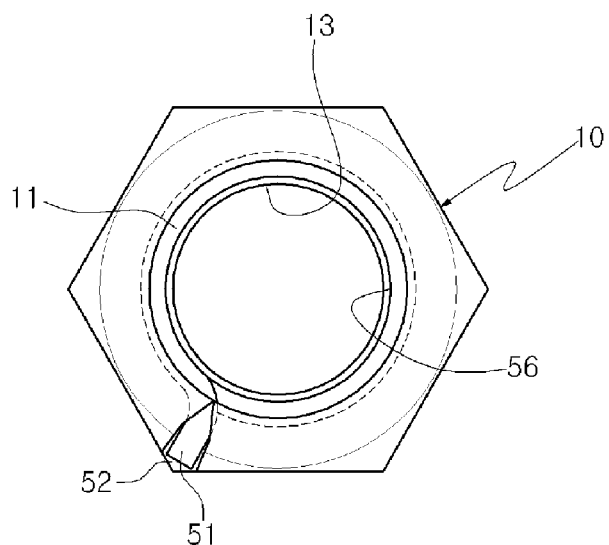
FIG. 4 is a plan view illustrating an anti-loose lock nut according to an exemplary embodiment of the present invention.

Also, as illustrated in FIG. 4, the end portions of the insertion groove 52 contact each other, at the state where the insertion groove 52 is opened, the bent end portion 51 of the coil spring 11 can move but be prevented from being seceded from the insertion groove 52. Also, the protruding support portion 56 is formed in the end of the nut 10, to thereby prevent the coil spring 11 from being seceded from the insertion groove 52 at the manufacturing or transporting or storing of the nut 10. In this exemplary embodiment, the whole surface of the nut 10 is pressurized by press, to thereby form the outer end of the exit side of the nut 10 in a ring form to then be protruded inwards.

Figure 5:
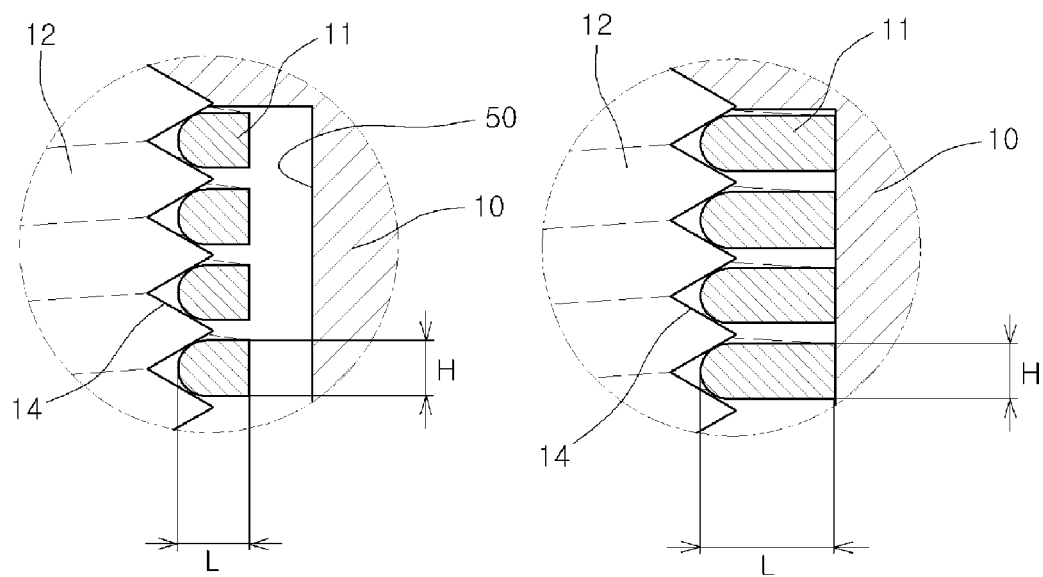
FIG. 5 is a cross-sectional view illustrating an anti-loose lock nut according to another exemplary embodiment of the present invention.

Also, as illustrated in FIG. 5, the central direction width L of the coil spring 11 can be formed sufficiently widely according to necessity. Accordingly, the cross-sectional area of the coil spring 11 can be controlled to freely control the intensity and elastic force of the coil spring 11. Therefore, the coil spring 11 can tighten the bolt 12 strongly, and the cross-sectional area of the coil spring 11 can be variously controlled in manufacture. Accordingly, there is an advantage that the shearing strength that the bent end portion 51 is cut can be variously controlled according to use places that anti-loose nuts are used. Also, the gap between the extended diameter portion 50 and the outer surface of the coil spring 11 can be formed widely or narrowly according to the cross-sectional area of the coil spring 11. Meanwhile, the extended diameter portion 50 and the outer surface of the coil spring 11 can be formed to contact each other according to need.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

As described above, according to the present invention, an extended diameter portion 50 is formed so that a coil spring 11 is installed in the inner circumferential surface of a nut 10. In addition, an insertion groove 52 is formed in the inner circumferential surface of the nut 10, so that a bent end portion 51 of the coil spring 11 is movably fitted into and coupled with the insertion groove 52. Clearance spaces 54 and 55 which enable the whole coil spring can move by one pitch or more in the lengthy direction are formed in the extended diameter portion 50 and the insertion groove 52. A point in place where the winding of the coil spring 11 starts smoothly matches a point in place where the thread 14 of the bolt 12 starts, to thus prevent damage to the bolt 12. Accordingly, delay of a coupling time and burden of a coupling work which are caused by the mismatch between the thread pitch 14 of the bolt 12 and the winding of the coil spring 11 can be solved. In addition, structures or facilities which are combined with bolts 12 and nuts 10 can be firmly maintained in view of a coupling force thereof.

In addition, according to the present invention, the cross-sectional shape of the coil spring 11 is formed of a rectangular shape in which a curved portion 53 is protruded inwards. The length direction width H of the coil spring 11 is narrower than the thread pitch P of the bolt 12 and the center direction width L of the coil spring 11 is wider than the thread pitch P of the bolt 12, to thereby strengthen the intensity and elastic force of the coil spring 11. As well, the center direction width L of the coil spring 11 is easily controlled as necessary, to thereby freely control the intensity and elastic force of the coil spring 11, and variously control the shearing strength that the bent end portion 51 is cut according to use places that anti-loose nuts are used.

Also, according to the present invention, the winding pitch W of the coil spring 11 is formed equally or smaller than the thread pitch P of the bolt 12. Accordingly, the whole length of the coil spring 11 can be formed in small size. As well, the protruding support portion 56 can be conveniently formed by pressurizing by press the outer end of the extended diameter portion 50 at the state where the coil spring 11 has been inserted into the extended diameter portion 50. Also, since the length of the extended diameter portion 50 can be formed in small size, the whole size of the nut 10 can be formed compactly. Accordingly, a loss of a material which is unnecessarily consumed to manufacture the nut 10 can be prevented.

Also, when the coil spring 11 matches the thread 14 of the bolt 12, the winding pitch W of the coil spring 11 becomes large and is coupled with the thread 14 of the bolt 12. The coil spring 11 is unfolded into the state which is substantially similar to the whole length of the extended diameter portion 50. As a result, since both ends of the coil spring 11 are supported by the extended diameter portion 50 and are applied by the compressive force of the coil spring 11 itself as well, the bolt 12 can be clamped further firmly.

The invention claimed is:

1. An anti-loose lock nut which prevents a screw coupling between a bolt and a nut by a coil spring which is mounted in the inner circumferential surface of the nut from loosening, the anti-loose lock nut characterized in that:
   an extended diameter portion whose inner diameter is wider than the thread of the nut and in the inside of which a spiral groove is not formed, is formed in the inner circumferential surface of the nut;
   an insertion groove into which a bent end portion is fit-coupled is formed in the end of the extended diameter portion, in which the end of the coil spring is outwardly bent to form the bent end portion;
   a semicircular curved portion is protrudingly formed in the inner surface of the coil spring, and the outer surface of the coil spring is formed of a flat cross-sectional plane;
   clearance spaces are formed in the lengthy width of the extended diameter portion and the insertion groove, respectively; and
   the coil spring is obtained by winding an elastic wire in a spiral direction, in which according to the cross-sectional shape, the lengthy direction width of the coil spring is narrower than the thread pitch of the bolt and the central direction width of the coil spring is wider than the thread pitch of the bolt.

2. The anti-loose nut of claim 1, wherein the winding pitch of the coil spring is the same or smaller than the thread pitch of the bolt.

* * * * *